US012567239B2

(12) United States Patent
Sadek

(10) Patent No.: US 12,567,239 B2
(45) Date of Patent: Mar. 3, 2026

(54) HYBRID SYSTEM FOR FEATURE DETECTION AND DESCRIPTOR GENERATION

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 18/449,461

(22) Filed: Aug. 14, 2023

(65) Prior Publication Data

US 2024/0153245 A1 May 9, 2024

Related U.S. Application Data

(60) Provisional application No. 63/382,458, filed on Nov. 4, 2022.

(51) Int. Cl.
*G06V 10/77* (2022.01)
*G06V 10/40* (2022.01)
*G06V 10/82* (2022.01)

(52) U.S. Cl.
CPC .......... *G06V 10/7715* (2022.01); *G06V 10/40* (2022.01); *G06V 10/82* (2022.01)

(58) Field of Classification Search
CPC ..... G06V 10/7715; G06V 10/40; G06V 10/82
See application file for complete search history.

(56) References Cited

U.S. PATENT DOCUMENTS

2019/0318502 A1* 10/2019 He ...................... G06F 18/2148

OTHER PUBLICATIONS

Bin Fan et al., "Seeing Through Darkness: Visual Localization at Night via Weakly Supervised Learning of Domain Invariant Features", Feb. 24, 2022, IEEE Transactions on Multimedia, vol. 25, pp. 1713-1726 (Year: 2022).*
International Search Report and Written Opinion—PCT/US2023/074077—ISA/EPO—Dec. 7, 2023.
Li S., et al., "A Research of ORB Feature Matching Algorithm Based on Fusion Descriptor", 2020 IEEE 5th Information Technology and Mechatronics Engineering Conference (ITOEC), Jun. 12, 2020, pp. 417-420, XP033794618, Abstract p. 3, the right-hand column, sec. "IV. Evaluation", first six lines p. 3, the right-hand column, the last para, images used to test the algorithm p. 2, the right-hand column, the second para starting with "Multi-scale oFAST feature detection", the second last para starting with "In order to make the distribution of corners in the image more uniform".

(Continued)

*Primary Examiner* — David F Dunphy
(74) *Attorney, Agent, or Firm* — Polsinelli LLP/QUALCOMM Incorporated

(57) ABSTRACT

Systems and techniques are provided for processing sensor data. For example, a process can include obtaining input data and processing, using a non-machine learning based feature detector feature detector, the input data to determine one or more feature points in the input data. The process can further include determining, using a machine learning system, a respective feature descriptor for each respective feature point of the one or more feature points.

18 Claims, 7 Drawing Sheets

(56)            References Cited

OTHER PUBLICATIONS

Ma T., et al., "ASD-SLAM: A Novel Adaptive-Scale Descriptor Learning for Visual SLAM", 2020 IEEE Intelligent Vehicles Symposium (IV), Oct. 19, 2020, pp. 809-816, XP033873148, Abstract figure 6 from p. 5, the right-hand column the last paragraph to p. 6, the left-hand, the first paragraph.

Rublee E., et al., "ORB: an Efficient Alternative to SIFT or SURF", International Conference on Computer Vision, Nov. 6, 2011, pp. 2564-2571, XP032093933, Abstract from p. 2, the right-hand column, section "3. oFAST: Fast Keypoint Orientation", to the right-hand column, line 12 p. 3, the left-hand column, the first paragraph.

Sun J., et al., "LoFTR: Detector-Free Local Feature Matching with Transformers", 2021 IEEE/CVF Conference on Computer Vision and Pattern Recognition (CVPR), IEEE, Jun. 20, 2021, pp. 8918-8927, XP034006635, Abstract figure 2 p. 2, the left-hand column, the first and second paragraph.

Vemulapati V., et al., "ORB-based SLAM Accelerator on SoC FPGA", arXiv:2207.08405v1 [eess.IV], arxiv.org, Cornell University Library, 201 Olin Library Cornell University Ithaca, NY 14853, Jul. 18, 2022, 11 Pages, XP091273864, Abstract p. 5-p. 8, Figures 3, 5-7.

* cited by examiner

600

Obtain Input Data
602

Process, Using A Feature Detector, The Input Data To Determine One Or More Feature Points In The Input Data
604

Determine, Using A Machine Learning System, A Respective Feature Descriptor For Each Respective Feature Point Of The One Or More Feature Points
606

HYBRID SYSTEM FOR FEATURE DETECTION AND DESCRIPTOR GENERATION

CROSS-REFERENCE TO RELATED APPLICATIONS

This application claims the benefit of U.S. Provisional Application 63/382,458, filed Nov. 4, 2022, which is hereby incorporated by reference, in its entirety and for all purposes.

FIELD

The present disclosure generally relates to processing sensor data (e.g., images, radar data, light detection and ranging (LIDAR) data, etc.). For example, aspects of the present disclosure are related to a hybrid system for performing feature (e.g., keypoint) detection and descriptor generation.

BACKGROUND

Many devices and systems allow characteristics of a scene to be captured based on sensor data, such as images (or frames) of a scene, video data (including multiple frames) of the scene, radar data, LIDAR data, etc. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

Degrees of freedom (DoF) refer to the number of basic ways a rigid object can move through three-dimensional (3D) space. In some examples, six different DoF of an object can be tracked, including three translational DoF and three rotational DoF. Certain devices can track some or all of these degrees of freedom. In some cases, tracking (e.g., 6 DoF tracking) can be used to perform localization and mapping functions. For example, to perform the localization and mapping functions, a device or system can perform feature analysis (e.g., extraction, tracking, etc.) and other complex functions.

BRIEF SUMMARY

In some examples, techniques are described for performing feature (e.g., keypoint) detection and descriptor generation using a hybrid system. According to at least one illustrative example, a method is provided for processing image data, the method including: obtaining input data; processing, using a non-machine learning based feature detector, the input data to determine one or more feature points in the input data; and determining, using a machine learning system, a respective feature descriptor for each respective feature point of the one or more feature points.

In another example, an apparatus for processing image data is provided that includes at least one memory and at least one processor (e.g., implemented in circuitry) coupled to the at least one memory. The at least one processor is configured to: obtain input data; process, using a non-machine learning based feature detector, the input data to determine one or more feature points in the input data; and determine, using a machine learning system, a respective feature descriptor for each respective feature point of the one or more feature points.

In another example, a non-transitory computer-readable medium is provided that has stored thereon instructions that, when executed by one or more processors, cause the one or more processors to: obtain input data; process, using a non-machine learning based feature detector, the input data to determine one or more feature points in the input data; and determine, using a machine learning system, a respective feature descriptor for each respective feature point of the one or more feature points.

In another example, an apparatus for processing image data is provided. The apparatus includes: means for obtaining input data; means for processing, using a non-machine learning based feature detector, the input data to determine one or more feature points in the input data; and means for determining, using a machine learning system, a respective feature descriptor for each respective feature point of the one or more feature points.

In some aspects, one or more of the apparatuses described herein is or is part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
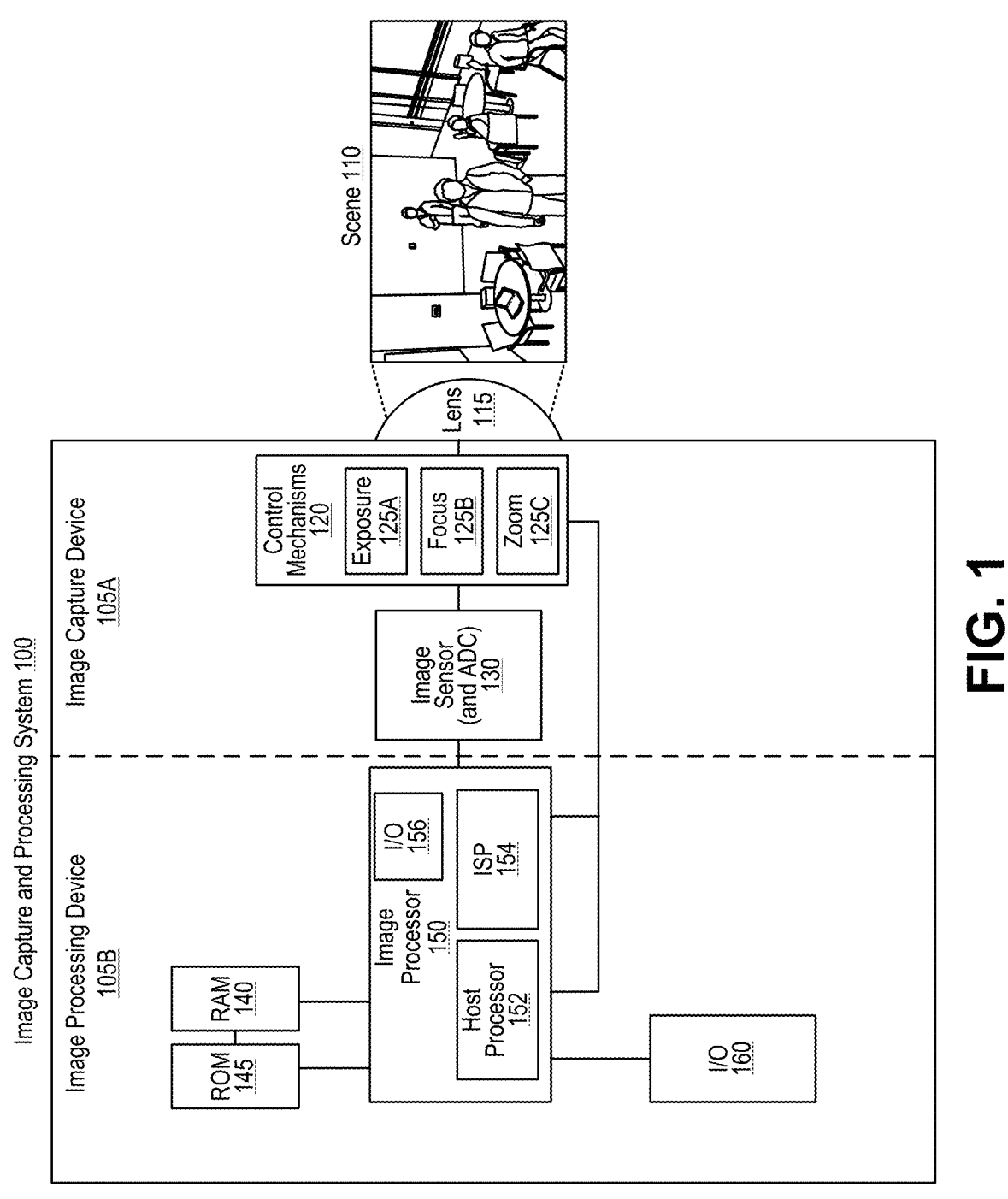
FIG. 1 is a block diagram illustrating an architecture of an image capture and processing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims As described above, a device and system can determine or capture characteristics of a scene based on sensor data associated with the scene. The sensor data can include as images (or frames) of a scene, video data (including multiple frames) of the scene, radar data, LIDAR data, any combination thereof and/or other data.

For example, an image capture device (e.g., a camera) is a device that receives light and captures image frames, such as still images or video frames, using an image sensor. The terms "image," "image frame," "video frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Degrees of freedom (DoF) refer to the number of basic ways a rigid object can move through three-dimensional (3D) space. In some examples, six different DoF of an object can be tracked. The six DoF can include three translational DoF corresponding to translational movement along three perpendicular axes, which can be referred to as x, y, and z axes. The six DoF can also include three rotational DoF corresponding to rotational movement around the three axes, which can be referred to as pitch, yaw, and roll. Some devices (e.g., extended reality (XR) devices, such as virtual reality (VR) or augmented reality (AR) headsets, mobile devices, vehicles or systems of vehicles, robotics devices, etc.) can track some or all of these degrees of freedom. For instance, a 3DoF tracker (e.g., of an XR headset) can track the three rotational DoF. A 6DoF tracker (e.g., of an XR headset) can track all six DoF.

In some cases, tracking (e.g., 6 DoF tracking) can be used to perform localization and mapping functions. Mapping can include a process of building or generating a map of a particular environment. Localization can include a process of determination a location of an object (e.g., a vehicle, an XR device, a robotics device, a mobile handset, etc.) within a map (e.g., the map generated using the mapping process). An example of a technique for localization and mapping is visual simultaneous localization and mapping (VSLAM). VSLAM is a computational geometry technique used in devices with cameras, such as vehicles or systems of vehicles (e.g., autonomous driving systems), XR devices (e.g., head-mounted displays (HMDs), AR headsets, etc.), robotics devices or systems, mobile handsets, etc. In VSLAM, a device can construct and update a map of an unknown environment based on frames captured by the device's camera. The device can keep track of the device's pose (e.g., a pose of an image sensor of the device, such as a camera pose, which may be determined using 6DOF tracking) within the environment (e.g., location and/or orientation) as the device updates the map. For example, the device can be activated in a particular room of a building and can move throughout the interior of the building, capturing image frames. The device can map the environment, and keep track of its location in the environment, based on tracking where different objects in the environment appear in different image frames. Other type of sensor data other than image frames may also be used for VSLAM, such as radar and/or LIDAR data.

In the context of systems that track movement through an environment (e.g., XR systems, robotics systems, vehicles such as automated vehicles, VSLAM systems, among others), degrees of freedom can refer to which of the six degrees of freedom the system is capable of tracking. As noted above, 3DoF tracking systems generally track the three rotational DoF (e.g., pitch, yaw, and roll). A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

To perform the localization and mapping functions, a device (e.g., XR devices, mobile devices, etc.) can perform feature analysis (e.g., extraction, tracking, etc.) and other complex functions. For example, keypoint features (also referred to as feature points or keypoints) can be determined from images captured by a camera. Descriptors for the keypoint features can also be generated in order to provide semantic meaning for the keypoint features. The keypoint features are features in the images that do not change in different conditions (e.g., different lighting and/or illuminations, different views, different weather conditions, etc.), such as points associated with corners of objects in the images, distinctive features of the objects, etc. The keypoint features can be used as non-semantic features to improve localization and mapping robustness. Keypoint features can include distinctive features extracted from one or more images, such as points associated with a corner of a table, an edge of a street sign, etc. Generating stable keypoint features and descriptors (e.g., that do not change over time as conditions and/or views of a scene change) is important so that localization and mapping using such features can be accurately performed.

However, it can be difficult to generate a common descriptor for the same feature detected in different images when the images are captured in different conditions (e.g., different lighting and/or illuminations, different views, different weather conditions, etc.). For example, a descriptor generated for a feature associated with a traffic sign detected in a first image captured in the daylight may be different than a descriptor generated for the same feature associated with the traffic sign detected in a second image captured in the dark (e.g., at night time). Similarly, a descriptor generated for a feature associated with a distinctive part of a building detected in a first image captured in clear conditions (e.g., sunny, no fog or clouds, etc.) may be different than a descriptor generated for the same feature associated with the same part of the building detected in a second image captured in the cloudy or rainy conditions.

In some cases, machine learning based systems (e.g., using a deep learning neural network) can be used to detect keypoint features (e.g., keypoints or feature points) for localization and mapping and to generate descriptors for the detected features. However, it can be difficult to obtain ground truth and annotations (or labels) for training a machine learning based keypoint feature (e.g., keypoint or feature point) detector and descriptor generator. For example, a benefit of using a machine learning based system to generate descriptors is so manual (e.g., by a human) annotation of features is not needed. However, a human may still be needed to generate descriptors that will be used as ground truth data (e.g., labeled data) for training the machine learning based system.

Systems, apparatuses, processes (also referred to as methods), and computer-readable media (collectively referred to as "systems and techniques") are described herein for providing a hybrid system for performing feature detection (e.g., to detect keypoints, also referred to as feature points) and descriptor generation. For example, the hybrid system can include a non-machine learning based feature detector and a machine learning based descriptor generator. In some aspects, the non-machine learning based feature detector (e.g., a feature point detector) can be based on, for example, computer vision algorithm. The non-machine learning based feature detector can detect or generate feature points (or keypoints) from input sensor data (e.g., one or more input images, LIDAR data, radar data, etc.).

The machine learning based descriptor generator can include or can be a machine learning system (e.g., a deep learning neural network) that can generate descriptors for the feature points (or keypoints) detected by the non-machine learning based feature detector. The machine learning based descriptor generator can generate the descriptors (also referred as feature descriptors) at least in part by generating a description of a feature as detected or depicted in input sensor data (e.g., a local image patch extracted around the feature in an image) by the non-machine learning based feature detector. In some cases, a feature descriptor can describe a feature as a feature vector or as a collection of feature vectors.

In some aspects, the machine learning system used for descriptor generation can include a transformer neural network architecture. For example, the transformer based neural network can use transformer cross-attention (e.g., cross-view attention) to determine a unique signature (which can be used as a feature descriptor) across different types of input data (e.g., images, radar data, and/or LIDAR data captured during the day, images, radar data, and/or LIDAR data captured during nighttime, images, radar data, and/or LIDAR data captured when rain is present, images, radar data, and/or LIDAR data captured when fog is present, etc.), providing robustness to varying input data. Generating a common or unique descriptor across such varying input data is more difficult to do manually.

Such a hybrid system allows the feature detection and descriptor generation to be performed using machine learning in an un-supervised manner (in which case no labeling is required for training). Further, the transformer-based solution described above (e.g., using cross-attention to generate a unique signature for different types of input data) can scale with more data, and can be trained using unsupervised learning (thus requiring no labeled data).

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the one or more control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The one or more focus control mechanisms 125B of the one or more control mechanisms 120 can obtain a focus setting. In some examples, the one or more focus control mechanisms 125B store the focus setting in a memory register. Based on the focus setting, the one or more focus control mechanisms 125B can adjust the position of the lens 115 relative to the position of the image sensor 130. For example, based on the focus setting, the one or more focus control mechanisms 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the one or more control mechanism 120, the image sensor 130, and/or the image processor 150. The focus setting may be referred to as an image capture setting and/or an image processing setting.

The one or more exposure control mechanisms 125A of the one or more control mechanisms 120 can obtain an exposure setting. In some cases, the one or more exposure control mechanisms 125A stores the exposure setting in a memory register. Based on this exposure setting, the one or more exposure control mechanisms 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The one or more zoom control mechanisms 125C of the one or more control mechanisms 120 can obtain a zoom setting. In some examples, the one or more zoom control mechanisms 125C stores the zoom setting in a memory register. Based on the zoom setting, the one or more zoom control mechanisms 125C can control a focal length of an assembly of lens elements (lens assembly) that includes the lens 115 and one or more additional lenses. For example, the one or more zoom control mechanisms 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the one or more zoom control mechanisms 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the one or more control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1610 discussed with respect to the computing system 1600. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1620, read-only memory (ROM) 145/1625, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1635, any other input devices 1645, or some combination thereof. In some cases, a caption may be input into the image processing device 105B through a physical keyboard or keypad of the I/O devices 160, or through a virtual keyboard or keypad of a touchscreen of the I/O devices 160. The I/O ports 156 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O ports 156 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, the one or more control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
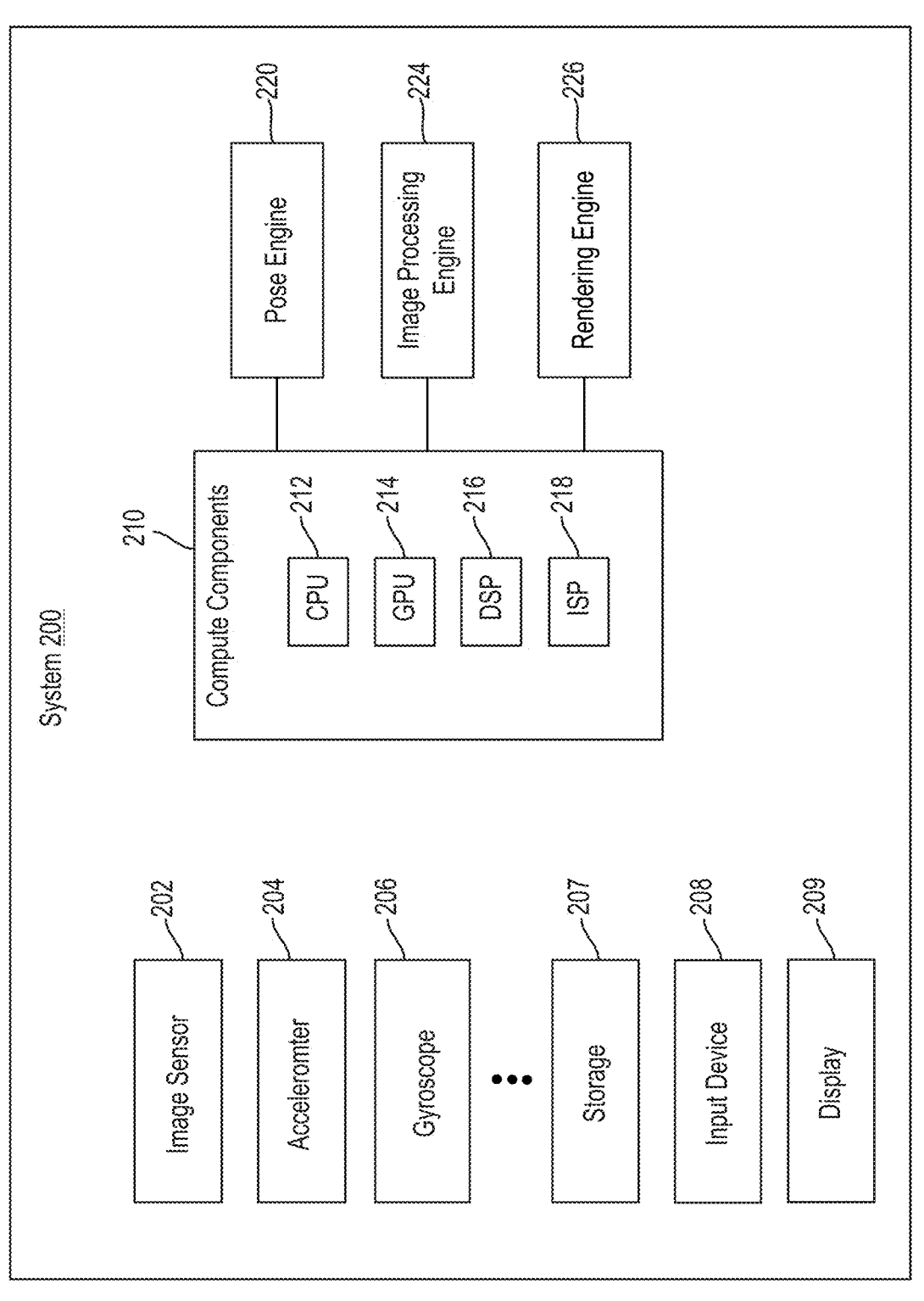
FIG. 2 is a block diagram illustrating an architecture of an example extended reality (XR) system, in accordance with some examples.

FIG. 2 is a diagram illustrating an architecture of an example system 200, in accordance with some aspects of the disclosure. The system 200 can be an XR system (e.g., running (or executing) XR applications and/or implementing XR operations), a system of a vehicle, a robotics system, or other type of system. The system 200 can perform tracking and localization, mapping of an environment in the physical world (e.g., a scene), and/or positioning and rendering of content on a display 209 (e.g., positioning and rendering of virtual content a screen, visible plane/region, and/or other display as part of an XR experience). For instance, the system 200 can generate a map (e.g., a three-dimensional (3D) map) of an environment in the physical world, track a pose (e.g., location and position) of the system 200 relative to the environment (e.g., relative to the 3D map of the environment), and/or determine a position and/or anchor point in a specific location(s) on the map of the environment. In one example, the system 200 can position and/or anchor virtual content in the specific location(s) on the map of the environment and can render virtual content on the display 209 such that the virtual content appears to be at a location in the environment corresponding to the specific location on the map of the scene where the virtual content is positioned and/or anchored. The display 209 can include a monitor, a glass, a screen, a lens, a projector, and/or other display mechanism. For example, in the context of an XR system, the display 209 can allow a user to see the real-world environment and also allows XR content to be overlaid, overlapped, blended with, or otherwise displayed thereon.

In this illustrative example, the system 200 includes one or more image sensors 202, an accelerometer 204, a gyroscope 206, storage 207, compute components 210, a pose engine 220, an image processing engine 224, and a rendering engine 226. It should be noted that the components 202-126 shown in FIG. 2 are non-limiting examples provided for illustrative and explanation purposes, and other examples can include more, less, or different components than those shown in FIG. 2. For example, in some cases, the system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the system 200, such as the image sensor 202, may be referenced in the singular form herein, it should be understood that the system 200 may include multiple of any component discussed herein (e.g., multiple image sensors 202).

The system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1645 discussed herein, or any combination thereof. In some cases, the image sensor 202 can capture images that can be processed for interpreting gesture commands.

In some implementations, the one or more image sensors 202, the accelerometer 204, the gyroscope 206, storage 207, compute components 210, pose engine 220, image processing engine 224, and rendering engine 226 can be part of the same computing device. For example, in some cases, the one or more image sensors 202, the accelerometer 204, the gyroscope 206, storage 207, compute components 210, pose engine 220, image processing engine 224, and rendering engine 226 can be integrated into a device or system, such as an HMD, XR glasses (e.g., AR glasses), a vehicle or system of a vehicle, smartphone, laptop, tablet computer, gaming system, and/or any other computing device. However, in some implementations, the one or more image sensors 202, the accelerometer 204, the gyroscope 206, storage 207, compute components 210, pose engine 220, image processing engine 224, and rendering engine 226 can be part of two or more separate computing devices. For example, in some cases, some of the components 202-126 can be part of, or implemented by, one computing device and the remaining components can be part of, or implemented by, one or more other computing devices.

The storage 207 can be any storage device(s) for storing data. Moreover, the storage 207 can store data from any of the components of the system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the pose engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, tracking, localization, pose estimation, mapping, content anchoring, content rendering, image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the pose engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the pose engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the pose engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the system 200) can be configured to also capture depth information. For example, in some implementations, image sensor 202 (and/or other camera) can include an RGB-depth (RGB-D) camera. In some cases, the system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the system 200 and can generate acceleration measurements based on the detected acceleration. In some cases, the accelerometer 204 can provide one or more translational vectors (e.g., up/down, left/right, forward/back) that can be used for determining a position or pose of the system 200. The gyroscope 206 can detect and measure the orientation and angular velocity of the system 200. For example, the gyroscope 206 can be used to measure the pitch, roll, and yaw of the system 200. In some cases, the gyroscope 206 can provide one or more rotational vectors (e.g., pitch, yaw, roll). In some examples, the image sensor 202 and/or the pose engine 220 can use measurements obtained by the accelerometer 204 (e.g., one or more translational vectors) and/or the gyroscope 206 (e.g., one or more rotational vectors) to calculate the pose of the system 200. As previously noted, in other examples, the system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the system 200, using a combination of one or more accelerometers, one or more gyroscopes, and/or one or more magnetometers. In some examples, the one or more sensors can output measured information associated with the capture of an image captured by the image sensor 202 (and/or other camera of the system 200) and/or depth information obtained using one or more depth sensors of the system 200.

The output of one or more sensors (e.g., the accelerometer 204, the gyroscope 206, one or more IMUs, and/or other sensors) can be used by the pose engine 220 to determine a pose of the system 200 (also referred to as the head pose) and/or the pose of the image sensor 202 (or other camera of the system 200). In some cases, the pose of the system 200 and the pose of the image sensor 202 (or other camera) can be the same. The pose of image sensor 202 refers to the position and orientation of the image sensor 202 relative to a frame of reference (e.g., with respect to the object). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the system 200. For example, the device tracker can fuse visual data (e.g., using a visual tracking solution) from the image data with inertial data from the measurements to determine a position and motion of the system 200 relative to the physical world (e.g., the scene) and a map of the physical world. As described below, in some examples, when tracking the pose of the system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the system 200 within the scene and the 3D map of the scene, etc. The 3D map can provide a digital representation of a scene in the real/physical world. In some examples, the 3D map can anchor location-based objects and/or content to real-world coordinates and/or objects. The system 200 can use a mapped scene (e.g., a scene in the physical world represented by, and/or associated with, a 3D map) to merge the physical and virtual worlds and/or merge virtual content or objects with the physical environment.

In some aspects, the pose (also referred to as a camera pose) of image sensor 202 and/or the system 200 as a whole can be determined and/or tracked by the compute components 210 using a visual tracking solution based on images captured by the image sensor 202 (and/or other camera of the system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown in FIG. 2), such as the SLAM system 300 of FIG. 3. SLAM refers to a class of techniques where a map of an environment (e.g., a map of an environment being modeled by system 200) is created while simultaneously tracking the pose of a camera (e.g., image sensor 202) and/or the system 200 relative to that map. The map can be referred to as a SLAM map, and can be three-dimensional (3D). The SLAM techniques can be performed using color or grayscale image data captured by the image sensor 202 (and/or other camera of the system 200), and can be used to generate estimates of 6DoF pose measurements of the image sensor 202 and/or the system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features (e.g., keypoints) observed from certain input images from the image sensor 202 (and/or other camera or sensor) to the SLAM map. For example, 6DoF SLAM can use feature point associations from an input image (or other sensor data, such as a radar sensor, LIDAR sensor, etc.) to determine the pose (position and orientation) of the image sensor 202 and/or system 200 for the input image. 6DoF mapping can also be performed to update the SLAM map. In some cases, the SLAM map maintained using the 6DoF SLAM can contain 3D feature points (e.g., keypoints) triangulated from two or more images. For example, keyframes can be selected from input images or a video stream to represent an observed scene. For every keyframe, a respective 6DoF camera pose associated with the image can be determined. The pose of the image sensor 202 and/or the system 200 can be determined by projecting features (e.g., feature points or keypoints) from the 3D SLAM map into an image or video frame and updating the camera pose from verified 2D-3D correspondences.

In one illustrative example, the compute components 210 can extract feature points (e.g., keypoints) from certain input images (e.g., every input image, a subset of the input images, etc.) or from each keyframe. A feature point (also referred to as a keypoint or registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in keyframes either match (are the same or correspond to) or fail to match the feature points of previously-captured input images or keyframes. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or keyframe, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the system 200 can also track the hand and/or fingers of the user to allow the user to interact with and/or control virtual content in a virtual environment. For example, the system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
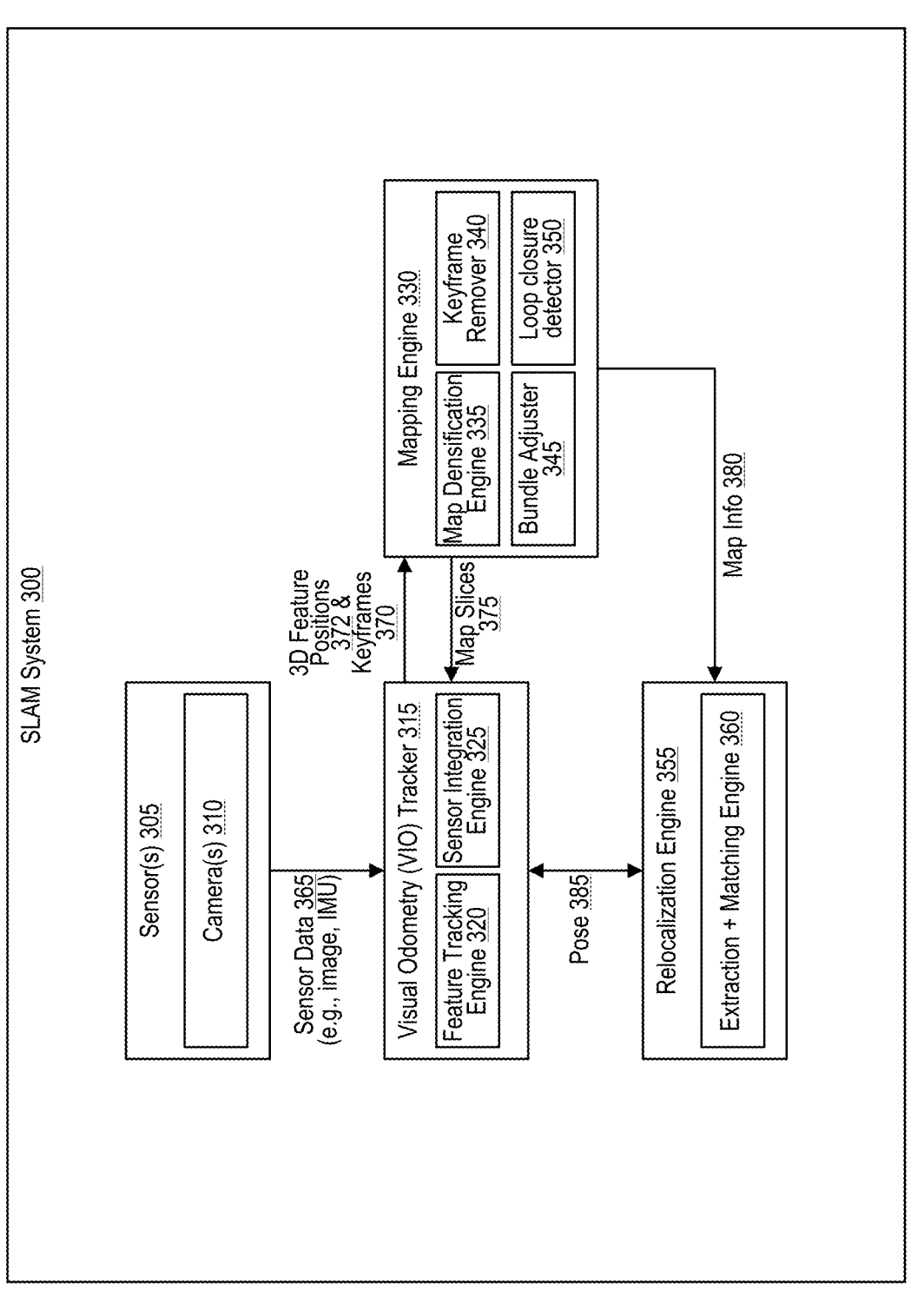
FIG. 3 is a block diagram illustrating an architecture of a simultaneous localization and mapping (SLAM) device, in accordance with some examples.

FIG. 3 is a block diagram illustrating an architecture of a simultaneous localization and mapping (SLAM) system 300. In some examples, the SLAM system 300 can be, can include, or can be a part of the system 200 of FIG. 2. In some examples, the SLAM system 300 can be, can include, or can be a part of an XR device, an autonomous vehicle, a vehicle, a computing system of a vehicle, a wireless communication device, a mobile device or handset (e.g., a mobile telephone or so-called "smart phone" or other mobile device), a wearable device (e.g., a network-connected watch), a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. In some cases, the VIO tracker 315 can be implemented using the hybrid system 500 discussed below with respect to FIG. 5.

The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 372 of a particular feature. The 3D feature positions 372 can include one or more 3D feature positions and can also be referred to as 3D feature points. The 3D feature positions 372 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. In some aspects, the VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 372 of the particular feature when considered by the feature tracking engine 320 and/or the sensor integration engine 325 for determination of the 3D feature positions 372. In some examples, a keyframe corresponding to a particular feature also includes data about the pose 385 of the SLAM system 300 and/or the camera(s) 310 during capture of the keyframe. In some examples, the VIO tracker 315 can send 3D feature positions 372 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 can generate a 3D map of the environment based on the 3D feature positions 372 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry.

The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 372. The map information 380 can include one or more keyframes 370 corresponding to certain features and certain 3D feature positions 372.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 372, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

Figure 4:
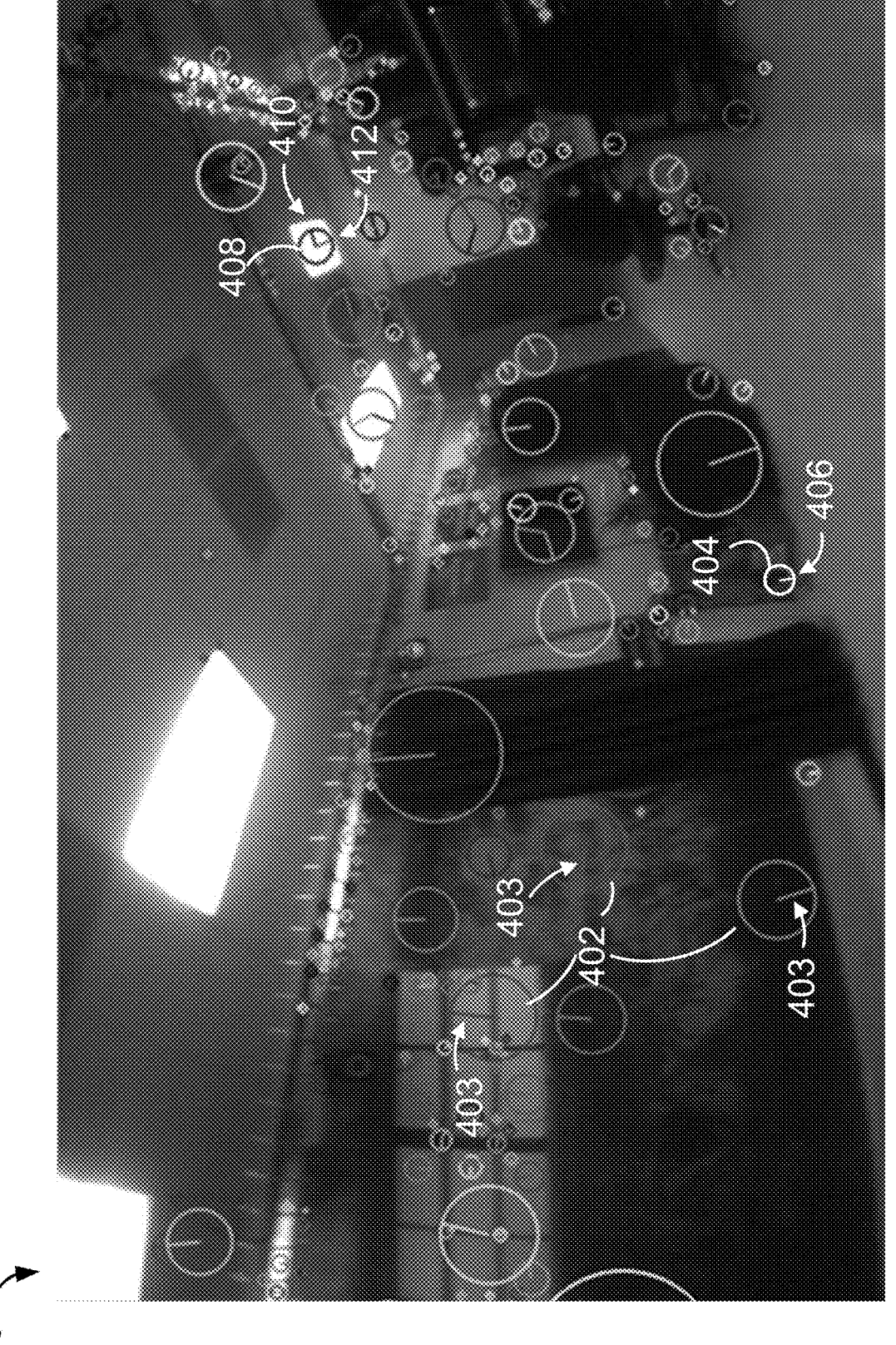
FIG. 4 is an example frame captured by a SLAM system, in accordance with some aspects.

FIG. 4 illustrate an example frame 400 of a scene. Frame 400 provides illustrative examples of feature information that can be captured and/or processed by a system (e.g., the system 200 shown in FIG. 2) during a tracking and/or mapping. In the illustrated example of FIG. 4, example features 402 are illustrated as circles of differing diameters. In some cases, the center of each of the features 402 can be referred to as a feature center location. In some cases, the diameter of the circles can represent a feature scale (also referred to as a blob size) associated with each of the example features 402. Each of the features 402 can also include a dominant orientation vector 403 illustrated as a radial segment. In one illustrative example, the dominant orientation vector 403 (also referred to as a dominant orientation herein) can be determined based on pixel gradients within a patch (also referred to as a blob or region). For instance, the dominant orientation vector 403 can be determined based on the orientation of edge features in a neighborhood (e.g., a patch of nearby pixels) around the center of the feature. Another example feature 404 is shown with a dominant orientation 406. In some implementations, a feature can have multiple dominant orientations. For example, if no single orientation is clearly dominant, then a feature can have two or more dominant orientations associated with the most prominent orientations. Another example feature 408 is illustrated with two dominant orientation vectors 410 and 412. In addition to the feature center location, blob size, and dominant orientation, each of the features 402, 404, 408 can also be associated with a descriptor that can be used to associate the features between different frames. For example, if the pose of the camera that captured frame 400 changes, the x-y coordinate of each of the feature center locations for each of the features 402, 404, 408 can also change, and the descriptor assigned to each feature can be used to match the features between the two different frames. In some cases, the tracking and mapping operations of an XR system can utilize different types of descriptors for the features 402, 404, 408. Examples of descriptors for the features 402, 404, 408 can include SIFT, FREAK, and/or other descriptors. In some cases, a tracker can operate on image patches directly or can operate on the descriptors (e.g., SIFT descriptors, FREAK descriptors, etc.).

As previously noted, machine learning based systems (e.g., using a deep learning neural network) can be used in some cases to detect features (e.g., keypoints or feature points) for localization and mapping and to generate descriptors for the detected features. However, obtaining ground truth and annotations (or labels) for training a machine learning based feature (e.g., keypoint or feature point) detector and descriptor generator can be difficult.

The systems and techniques described herein provide a hybrid system for performing feature detection to detect feature points (or keypoints) and descriptor generation to generate feature descriptors. As described herein, the hybrid system can include a non-machine learning based feature detector (e.g., a feature point detector based on, for example, computer vision algorithms) for detecting feature points and a machine learning based descriptor generator (e.g., a deep learning neural network) for generating descriptors (e.g., feature descriptors) for the detected feature points (or keypoints). The machine learning based descriptor generator can generate a descriptor at least in part by generating a description of a feature as detected or depicted in input sensor data.

Figure 5:
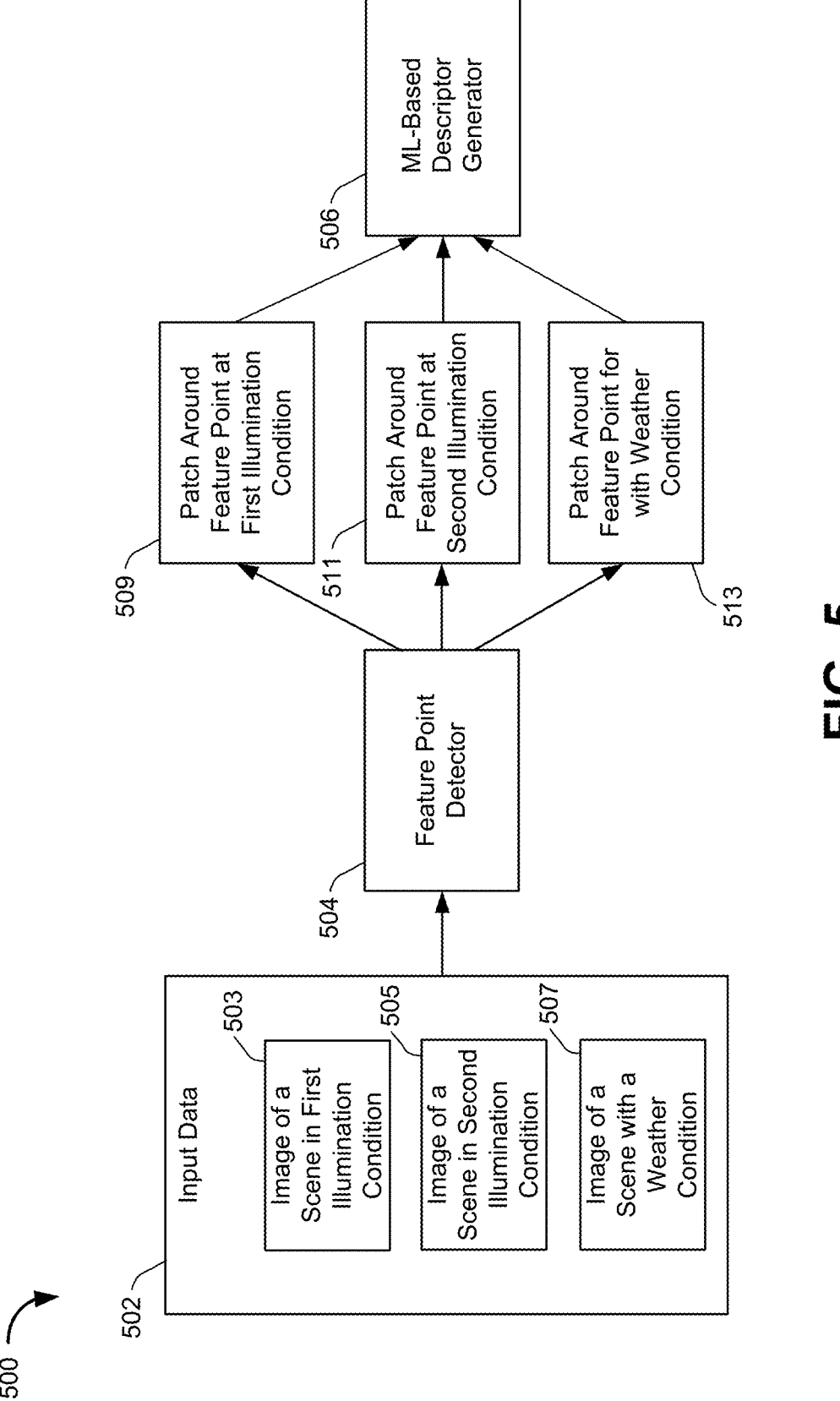
FIG. 5 is a diagram illustrating an example of a hybrid system 500 for detecting features (e.g., keypoints or feature points) and generating descriptors for the detected features, in accordance with some aspects.

FIG. 5 is a diagram illustrating an example of a hybrid system 500 for detecting features (e.g., keypoints or feature points) and generating descriptors (e.g., feature descriptors) for the detected features. As noted above, in some cases, the VIO tracker 315 described above with respect to FIG. 4 can be implemented using the hybrid system 500 of FIG. 5. The hybrid system 500 includes a feature point detector 504 and a machine learning (ML) based descriptor generator 506.

The feature point detector 504 is a non-machine learning based feature detector. For example, the feature point detector 504 can detect feature points (or keypoints) from input data 502 using, for example, one or more computer vision algorithms. The input data 502 can include image data, radar data (e.g., a radar image), LIDAR data (e.g., a LIDAR point cloud), and/or other sensor data. In one illustrative example, as shown in FIG. 5, the input data 502 can include an image 503 a scene in a first illumination condition (e.g., in the daytime), an image 505 of the same scene in a second illumination condition (e.g., at nighttime), and an image 507 of the same scene with a particular weather condition present (e.g., fog, rain, etc.). Multiple sets of images with similar differences can also be included in the input data.

In some illustrative examples, the input data 502 can include other images of the same scene but from different angles during the first illumination condition (e.g., during the daytime), during the second illumination condition (e.g., at nighttime), and with the same or different weather conditions. Additionally or alternatively, in some illustrative examples, the input data 502 can include images of different scenes during the day, at night, and with the same or different weather conditions.

The feature point detector 504 can detect keypoints in the images 503, 505, 507. The feature point detector 504 can output a patch 509 around a feature point (or keypoint) detected in the image 503, a patch 511 around the same feature point (or keypoint) detected in the image 505, and a patch 513 around the same feature point (or keypoint) detected in the image 507. Similar patches can be generated for other feature points detected in the images 503, 505, 507 and in other images and/or sensor data.

The patches 509, 511, and 513 can be output to the ML-based descriptor generator 506 for descriptor generation. The ML-based descriptor generator 506 can process the patches 509, 511, and 513 to generate feature descriptors for the features in the respective patches 509, 511, and 513. Each feature descriptor can describe a respective feature as a feature vector or as a collection of feature vectors, as described above with respect to FIG. 3.

In some aspects, the ML based descriptor generator 506 can include a transformer-based neural network having a transformer neural network architecture. The transformer-based neural network can use transformer cross-attention (e.g., cross-view attention across sensor data from different views or perspectives of a common feature) to determine a unique signature across the different types of input data 502. The unique signature can then be used as a feature descriptor.

A loss function can be used to train the ML based descriptor generator 506 (e.g., by backpropagating gradients determined based on a loss determined by the loss function). The loss function can enforce the same descriptor across different characteristics of the input data 502 (e.g., across all illumination conditions, weather, etc.). In such cases, labels are not needed and thus the ML model of the ML based descriptor generator 506 can be trained in an unsupervised manner.

The hybrid system 500 provides advantages over traditional systems for detecting features and generating detectors. For example, as noted previously, it can be difficult to generate a common descriptor for a same feature detected in different sensor data (e.g., images, radar data, LIDAR data, etc.) when the sensor data is captured in different conditions (e.g., different lighting and/or illuminations, different views, different weather conditions, etc.). In one example, a descriptor generated for a feature associated with an edge of a traffic sign detected in a first image captured in the daylight may be different than a descriptor generated for the same feature associated with the edge of the traffic sign detected in a second image captured in the dark (e.g., at night time). For instance, during the daytime in the daylight, the background behind the traffic sign may be blue (e.g., corresponding to blue sky), whereas the background behind the traffic sign may be black (e.g., corresponding to a dark sky) during the night. Traditional computer-vision algorithms take as input neighboring pixels surrounding an edge or other distinctive portion of an object (e.g., the traffic sign), and encode information associated with the neighboring pixels (e.g., based on a gradient, how the color changes, etc.) to generate a descriptor. However, if the neighboring pixels are a different color and/or brightness (e.g., blue and high illuminance) during the day than during the night (e.g., black and low illuminance), two different descriptors for the same feature may be different. If a device or system (e.g., a vehicle, an XR device, a robotics device, etc.) receives the two descriptors corresponding to a feature for the edge of the traffic sign, the device or system will determine that the two descriptors correspond to different locations, whereas the feature (e.g., the edge of the traffic sign) actually corresponds to the same location. Using such a technique will thus cause the device or system to perform inaccurate localization.

The hybrid system 500 allows the feature detection to be performed using non-ML techniques and the descriptor generation to be performed using machine learning in an un-supervised manner (in which case no manual labeling is required for training). The ML-based descriptor generator 506 (e.g., utilizing a transformer-based architecture) provides robustness to varying input data by generating a common or unique descriptor across such varying input data. Further, the ability of the ML-based descriptor generator 506 (e.g., using cross-attention based on the transformer-based architecture) to generate a unique signature for features detected in different types of input data can scale with more data, and requires no labeled data.

Figure 6:
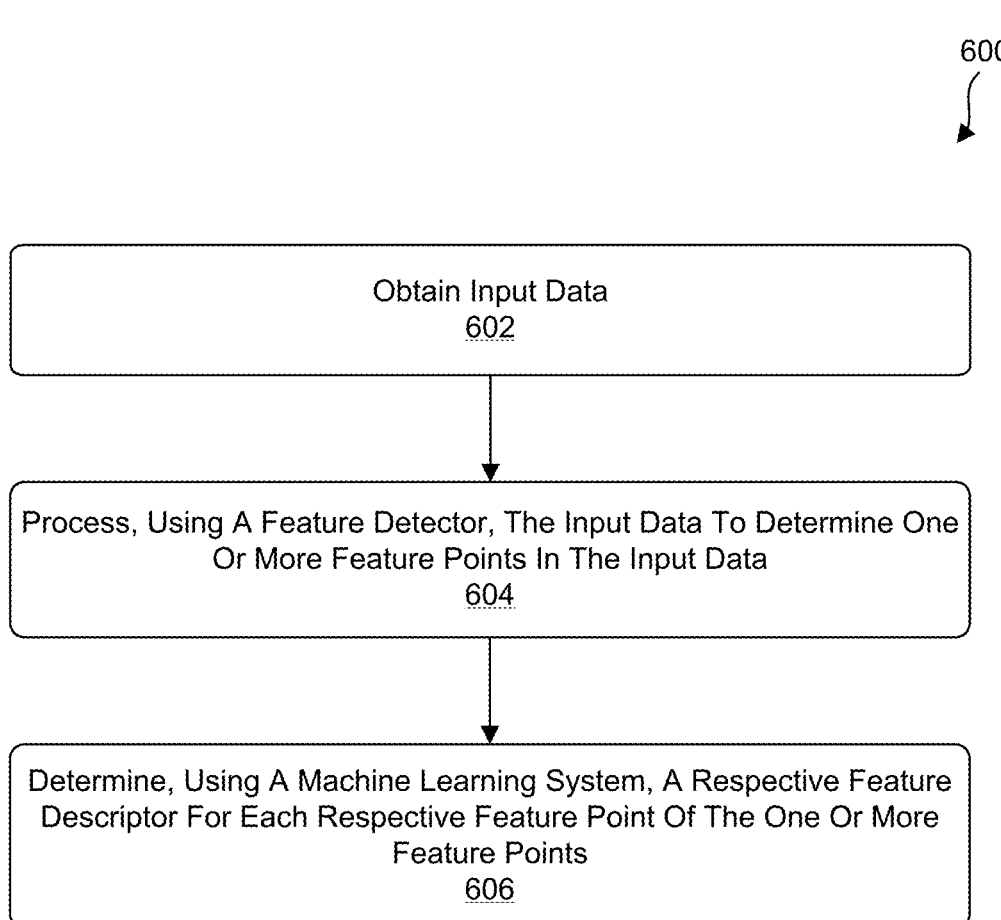
FIG. 6 is a flow diagram illustrating an example of a process for processing image data, in accordance with some examples of the present disclosure.

FIG. 6 is a flowchart illustrating an example of a process 600 for processing image and/or video data. The process 600 can be performed by a computing device (or apparatus), or a component or system (e.g., a chipset) of the computing device. The computing device (or component or system thereof) can include or can be the hybrid system 500 of FIG. 5. The operations of the process 1000 may be implemented as software components that are executed and run on one or more processors (e.g., the processor 710 of FIG. 7 or other processor(s)). Further, the transmission and reception of signals by the first network entity in the process 600 may be enabled, for example, by one or more antennas and/or one or more transceivers such as wireless transceiver(s).

At block 602, the computing device (or component or system thereof) can obtain input data (e.g., input data 502). In some cases, the input data includes one or more images, radar data, light detection and ranging (LIDAR) data, any combination thereof, and/or other data. In one illustrative example, the input data includes a first image of a scene with a first characteristic, a second image of a scene with a second characteristic, and a third image of a scene with a third characteristic. For instance, the first characteristic can be a daytime characteristic, the second characteristic can be a nighttime characteristic, and the third characteristic can be a weather condition, as shown in the illustrative example of FIG. 5.

At block 604, the computing device (or component or system thereof) can process, using a non-machine learning based feature detector (e.g., feature point detector 504), the input data to determine one or more feature points in the input data. In one illustrative example, the non-machine learning based feature detector is configured to determine the one or more feature points based on a computer vision algorithm, as described herein (e.g., with respect to FIG. 5).

At block 606, the computing device (or component or system thereof) can determine, using a machine learning system (e.g., the ML-based descriptor generator 506), a respective feature descriptor for each respective feature point of the one or more feature points. In one illustrative example, the machine learning system is a neural network. For instance, the neural network may be or may include a transformer neural network. In some cases, as described herein, the transformer neural network is configured to perform cross-attention. For example, the computing device (or component or system thereof) can utilize the transformer neural network to perform transformer cross-attention (e.g., cross-view attention) to determine a unique signature across the obtained input data (e.g., the different types of input data 502). The unique signature can be used as a feature descriptor. For instance, the respective feature descriptor for each respective feature point can be based on the unique signature. The computing device (or component or system thereof) can apply a loss function to train transformer neural network (e.g., by backpropagating gradients determined based on a loss determined by the loss function). As noted above, the loss function can enforce the same descriptor across different characteristics of the input data 502 (e.g., across all illumination conditions, weather, etc.), providing robustness to different inputs with varying characteristics.

The computing device (or apparatus) can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an vehicle (e.g., an autonomous vehicle or semi-autonomous vehicle) or computing device or system of the vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
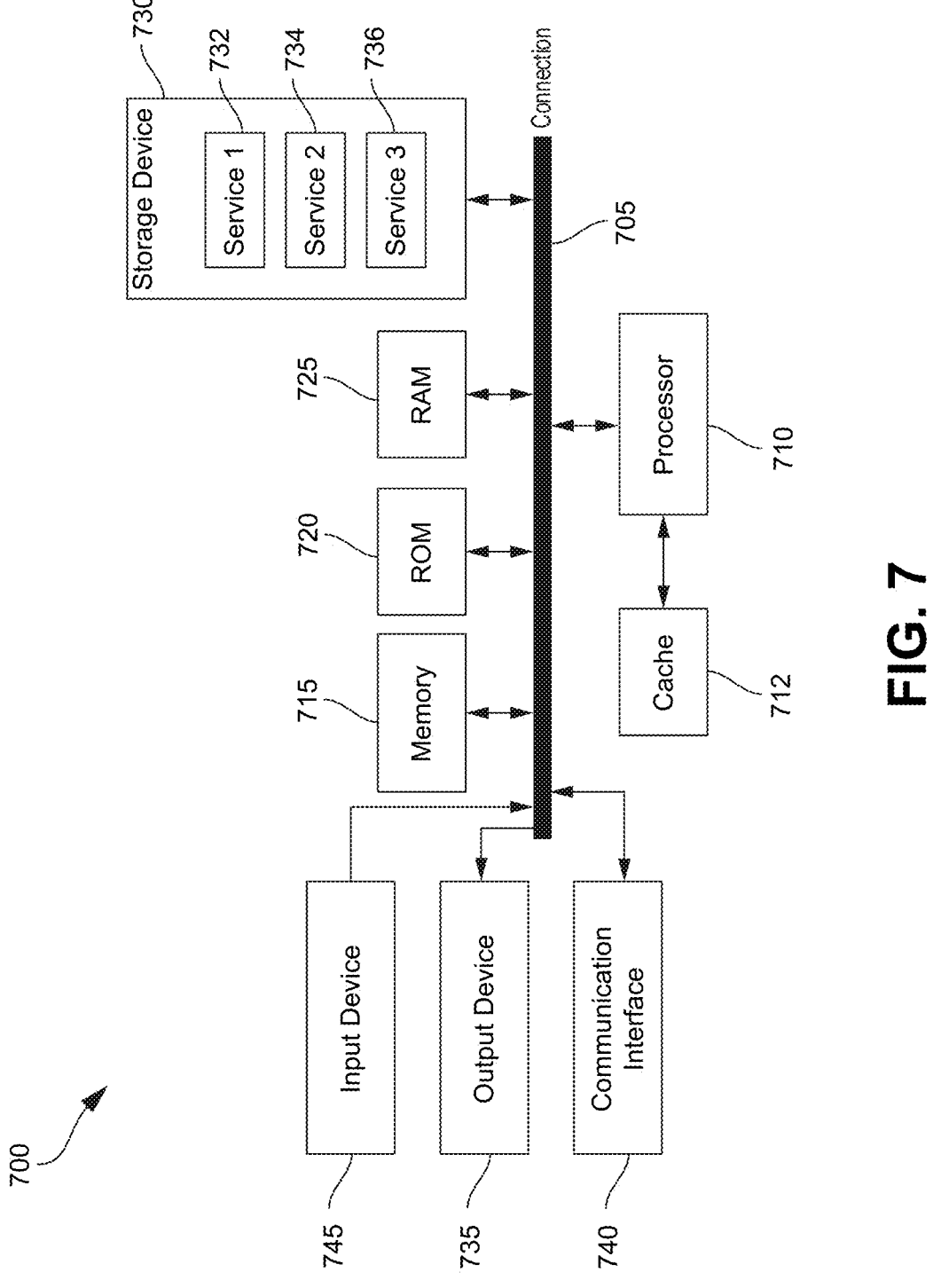
FIG. 7 is a block diagram illustrating an example of a computing system for implementing certain aspects described herein.

FIG. 7 illustrates an example computing device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 700 can implement the system 500 of FIG. 5. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random-access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other engines can control or be configured to control processor 710 to perform various actions. Other computing device memory 715 may be available for use as well. Memory 715 can include multiple different types of memory with different performance characteristics. Processor 710 can include any general-purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules or engines are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing image data, comprising: at least one memory; and at least one processor coupled to the at least one memory, the at least one processor configured to: obtain input data; process, using a non-machine learning based feature detector, the input data to determine one or more feature points in the input data; and determine, using a machine learning system, a respective feature descriptor for each respective feature point of the one or more feature points.

Aspect 2. The apparatus of Aspect 1, wherein the input data includes at least one of one or more images, radar data, or light detection and ranging (LIDAR) data.

Aspect 3. The apparatus of any one of Aspects 1 or 2, wherein the input data includes a first image of a scene with a first characteristic, a second image of a scene with a second characteristic, and a third image of a scene with a third characteristic.

Aspect 4. The apparatus of Aspect 3, wherein the first characteristic is a daytime characteristic, the second characteristic is a nighttime characteristic, and the third characteristic is a weather condition.

Aspect 5. The apparatus of any one of Aspects 1 to 4, wherein the non-machine learning based feature detector is configured to determine the one or more feature points based on a computer vision algorithm.

Aspect 6. The apparatus of any one of Aspects 1 to 5, wherein the machine learning system is a neural network.

Aspect 7. The apparatus of Aspect 6, wherein the neural network is a transformer neural network.

Aspect 8. A method for processing image data, the method comprising: obtaining input data; processing, using a non-machine learning based feature detector, the input data to determine one or more feature points in the input data; and determining, using a machine learning system, a respective feature descriptor for each respective feature point of the one or more feature points.

Aspect 9. The method of Aspect 8, wherein the input data includes at least one of one or more images, radar data, or light detection and ranging (LIDAR) data.

Aspect 10. The method of any one of Aspects 8 or 9, wherein the input data includes a first image of a scene with a first characteristic, a second image of a scene with a second characteristic, and a third image of a scene with a third characteristic.

Aspect 11. The method of Aspect 10, wherein the first characteristic is a daytime characteristic, the second characteristic is a nighttime characteristic, and the third characteristic is a weather condition.

Aspect 12. The method of any one of Aspects 8 to 11, further comprising determining, using the non-machine learning based feature detector, the one or more feature points based on a computer vision algorithm.

Aspect 13. The method of any one of Aspects 8 to 12, wherein the machine learning system is a neural network.

Aspect 14. The method of Aspect 13, wherein the neural network is a transformer neural network.

Aspect 15. A non-transitory computer-readable storage medium having stored thereon instructions which, when executed by one or more processors, cause the one or more processors to perform any of the operations of any of Aspects 8 to 14.

Aspect 16. An apparatus comprising means for performing any of the operations of any of Aspects 8 to 14.

What is claimed is:

1. An apparatus for processing image data, comprising:
at least one memory; and
at least one processor coupled to the at least one memory, the at least one processor configured to:
obtain input data;
process, using a non-machine learning based feature detector, the input data to determine one or more feature points in the input data; and
determine, using a machine learning system, a respective feature descriptor for each respective feature point of the one or more feature points, wherein the machine learning system is a neural network, and wherein the neural network is a transformer neural network.

2. The apparatus of claim 1, wherein the input data includes at least one of one or more images, radar data, or light detection and ranging (LIDAR) data.

3. The apparatus of claim 1, wherein the input data includes a first image of a scene with a first characteristic, a second image of a scene with a second characteristic, and a third image of a scene with a third characteristic.

4. The apparatus of claim 3, wherein the first characteristic is a daytime characteristic, the second characteristic is a nighttime characteristic, and the third characteristic is a weather condition.

5. The apparatus of claim 1, wherein the non-machine learning based feature detector is configured to determine the one or more feature points based on a computer vision algorithm.

6. The apparatus of claim 1, wherein the transformer neural network is configured to perform transformer cross-attention to determine a unique signature across the obtained input data, wherein the respective feature descriptor for each respective feature point is based on the unique signature.

7. A method for processing image data, the method comprising:
obtaining input data;
processing, using a non-machine learning based feature detector, the input data to determine one or more feature points in the input data; and
determining, using a machine learning system, a respective feature descriptor for each respective feature point of the one or more feature points, wherein the machine learning system is a neural network, and wherein the neural network is a transformer neural network.

8. The method of claim 7, wherein the input data includes at least one of one or more images, radar data, or light detection and ranging (LIDAR) data.

9. The method of claim 7, wherein the input data includes a first image of a scene with a first characteristic, a second image of a scene with a second characteristic, and a third image of a scene with a third characteristic.

10. The method of claim 9, wherein the first characteristic is a daytime characteristic, the second characteristic is a nighttime characteristic, and the third characteristic is a weather condition.

11. The method of claim 7, further comprising determining, using the non-machine learning based feature detector, the one or more feature points based on a computer vision algorithm.

12. The method of claim 7, wherein the transformer neural network is configured to perform transformer cross-attention to determine a unique signature across the obtained input data, wherein the respective feature descriptor for each respective feature point is based on the unique signature.

13. A non-transitory computer-readable medium having stored thereon instructions which, when executed by one or more processors, cause the one or more processors to:
obtain input data;
process, using a non-machine learning based feature detector, the input data to determine one or more feature points in the input data; and determine, using a machine learning system, a respective feature descriptor for each respective feature point of the one or more feature points, wherein the machine learning system is a neural network, and wherein the neural network is a transformer neural network.

14. The non-transitory computer-readable medium of claim 13, wherein the input data includes at least one of one or more images, radar data, or light detection and ranging (LIDAR) data.

15. The non-transitory computer-readable medium of claim 13, wherein the input data includes a first image of a scene with a first characteristic, a second image of a scene with a second characteristic, and a third image of a scene with a third characteristic.

16. The non-transitory computer-readable medium of claim 15, wherein the first characteristic is a daytime characteristic, the second characteristic is a nighttime characteristic, and the third characteristic is a weather condition.

17. The non-transitory computer-readable medium of claim 13, wherein the non-machine learning based feature detector is configured to determine the one or more feature points based on a computer vision algorithm.

18. The non-transitory computer-readable medium of claim 13, wherein the transformer neural network is configured to perform transformer cross-attention to determine a unique signature across the obtained input data, wherein the respective feature descriptor for each respective feature point is based on the unique signature.

* * * * *